US005955525A

United States Patent [19]

Sanchez et al.

[11] Patent Number: 5,955,525

[45] Date of Patent: *Sep. 21, 1999

[54] FIRE RESISTANT LOW SMOKE EMISSION HALOGEN-FREE POLYOLEFIN FORMULATION

[75] Inventors: Fernando Labastida Sanchez, Querétaro Qro.; Alfonso Perez Sanchez, Queretaro, both of Mexico

[73] Assignee: Servicios Condumex S.A. de C.V., Queretaro, Mexico

[ * ] Notice: This patent issued on a continued prosecution application filed under 37 CFR 1.53(d), and is subject to the twenty year patent term provisions of 35 U.S.C. 154(a)(2).

[21] Appl. No.: 08/851,069

[22] Filed: May 5, 1997

[30] Foreign Application Priority Data

Feb. 28, 1997 [MX] Mexico .................................... 971573

[51] Int. Cl.$^6$ ....................................................... C08K 5/24

[52] U.S. Cl. .......................... 524/264; 524/265; 524/436; 524/437

[58] Field of Search .................................... 524/436, 437, 524/264, 265

[56] References Cited

U.S. PATENT DOCUMENTS

| | | | |
|---|---|---|---|
| 3,832,326 | 8/1974 | North | 524/437 |
| 4,381,362 | 4/1983 | Biggs et al. | 524/264 |
| 4,675,364 | 6/1987 | Churma et al. | 524/387 |
| 4,871,795 | 10/1989 | Pawar | 524/268 |
| 5,191,004 | 3/1993 | Maringer et al. | 524/436 |
| 5,225,469 | 7/1993 | Maringer et al. | 524/265 |
| 5,412,012 | 5/1995 | Horwatt et al. | 524/436 |
| 5,654,362 | 8/1997 | Schulz et al. | 524/862 |

*Primary Examiner*—Veronica P. Hoke
*Attorney, Agent, or Firm*—Carmen Pili-Curtis

[57] ABSTRACT

The insulating formulation is a mixture of vulcanizable halogen free polyolefins with low smoke emission and fire resistance characteristics, for application in compounds to insulate and cover cables and electric conductors. The polyolefins are formulated with a hydrated inorganic charge, an alkoxysilane, a curing agent, an additive such as a process assistance agent and a combination of two antioxidants, a hindered phenol and a zinc-mercapto toluimidazole salt. The stabilized formulations with the antioxidant combination of phenol with steric hindrance and zinc 2 mercapto toluimidazole salt offer a good thermostability at 3000 hours at a temperature of 125° C. and at 240 hours at a temperature of 165° C. and does not stain or decolorate the copper surface when the composition is steam vulcanized.

18 Claims, No Drawings

FIRE RESISTANT LOW SMOKE EMISSION HALOGEN-FREE POLYOLEFIN FORMULATION

BACKGROUND OF THE INVENTION

1. Field of the Invention

This invention relates to the promotion of low smoke emission and fire-resistance characteristics in a vulcanizable and halogen-free polyolefin mixture for application in compounds to isolate and cover cables and electric conductors.

2. Description of the State of the Art

One of the main applications of the fire-resistant and low smoke emission polymer compounds is as insulation for cables and electric conductors, where the main objective is to introduce better safety conditions in cable operation, above all in fire-hazard conditions, and where the physical properties and thermostability of the compositions should not deteriorate under operation conditions. The compositions are applied as insulations on cables and electric conductors in reduced thickness within a 10 to 15 mil range according to the norm for low tension primary cables, SAE J 1128, and for UL cables 125° C. according to UL 44 SIS. The compositions present a good balance of the main properties such as chemical and electrical physico-mechanic processability with fire resistance, low toxicity and low smoke emission.

Thus, for example, in U.S. Pat. No. 5,256,488 cable insulating compositions are described that improve fire resistance and do not discolor or remove the copper conductor gloss after steam vulcanization. In this invention, these characteristics are obtained but using a mixture of different copolymers based on vinyl ethylene ester and alkyl ethylene acrylate with a low charge of different antioxidants such as pentaerythritol beta alkylthio propionate and steric phenol.

In U.S. Pat. No. 5,412,012, an insulating composition is also described, the main characteristic of which is to improve the adherence to the metal conductor and the composition of which is similar to the one of the previously mentioned patent, the only difference being the use of a mixture of antioxidant agents including thio diethylene bis(3,5-di-tert-butyl-4-hydroxyhydro cinnamate) compound.

In Mexican patent 162481 an insulating material made up of fire-retardant polyolefin based on an ethylene and vinyl ester of carboxylic acid copolymer and mixtures of acrylate is claimed, however this material includes halogenated materials and antimony trioxide, which are undesirable.

The main advantages obtained when developing said compositions are: (a) without the use of halogen based fire resistant materials to eliminate the potential risk of being in contact with hydrogen halide based smoke generated in a conflagration (b) without the use of carbon black charges it is possible to obtain compositions that can be colored (c) without the use of antimony trioxide the use of halogenated ingredients is avoided.

Hereinbelow this invention shall be described in a more detailed way but, of course, without limiting its scope.

DETAILED DESCRIPTION OF THE INVENTION

The polymer composition with resistance to flame propagation, low smoke emission and high thermostability during long term aging of 3000 hours at the cable operation temperatures of 125° C. and during short term aging of 240 hours at a temperature of 165° C., is based on an ethylene and vinyl ester of an aliphatic carboxylic acid copolymer alone or combined with another series of polyolefins with a series of active components that notably improve the thermostability, fire-resistance and low smoke emission. The amounts of the compound are expressed in parts per hundred of resin or the sum of said resin and other resins involved.

The components of the formulation are described hereinbelow.

Ethylene Copolymer

The polymer component of the present composition is an ethylene and vinyl ester of aliphatic carboxylic acid copolymer. The vinyl ester can be a vinyl ester of a C2-C6 aliphatic carboxylic acid, such as vinyl acetate, vinyl propionate, vinyl butyrate, vinyl pentanoate, or vinyl hexanoate. In the present invention, the copolymer used is an ethylene and vinyl acetate (EVA) polymer which can be contained in the polymer compositions in a ratio of about 6% to about 90%, preferably from approximately 9% to approximately 45%, and especially from approximately 9% to approximately 28% of vinyl acetate, the rest being ethylene. Terpolymers of ethylene, vinyl acetate and other types of polymerizable olefinic monomers can be used. Generally, if a third monomer is present, it will represent no more than 15% of the total polymer composition.

It is also possible to use other types of polymers such as polyethylene polypropylene, ethylene-propylene copolymers and tertpolymers. Low density polyethylene and low density linear polyethylene, must have melting indexes within a 0.5 to 20 g/10 min. range to promote uniform and acceptable mixtures, mainly when the ratios vary from 30% or less with regard to the total polymer composition.

The ethylene copolymers and the mixtures shall have melting indexes within a range from 0.1 to 7 g/10 min. The EVA copolymers must generally have a melting index between 0.5 and 5 g/10 min.

Mydrated Inorganic Charge

The charges used for the present invention are hydrated inorganic charges, chemically known as hydrated aluminum oxide ($Al_2O_3$ $3H_2O$ or $Al(OH)_3$) hydrated magnesia, hydrated calcium silicate and hydrated magnesium carbonate. Among these compounds, the hydrated alumina is the most frequently used. The hydration water that is present in this type of charges must be capable of being released at the moment of the combustion process of the polymer composition. The use of these charges will basically depend on the flame retardance level to be obtained and on the viscosity reached by the polymeric composition upon increasing of the proportion of the same.

The hydration water of the inorganic charge is a chemical bond and is released through an endothermal reaction, thus these charges are used to give fire resistance to the polymer compositions. These charges, as well as other halogen based type of charges, can offer to the polymer composition the same fire retardance characteristics. The size of the charge particle must be according to the rheologic characteristics that are necessary to reach the processability conditions of the most favorable polymeric compositions and thus to reach the physico-mechanical, fire retardance and chemical characteristics necessary to meet the application requirements.

Silane Compound

For the present invention, various alkoxysilanes were used in order to determine which of them would be the most adequate for this type of polymer compositions. It is important to define the exact type as well as the alkoxysilane ratio to be used because if it is not well selected it may undesirably affect the final properties of the compositions.

The alkoxysilanes used were vinyl trimethoxyethoxysilane, phenyl tris(2-methoxyethoxy) silane, methyltriethoxysilane, ethylmethyl tris(2-methoxyethoxy)silane, dimethyl diethoxysilane, ethyl trimethoxysilane and vinyl trimethoxysilane.

The alkoxysilane especially preferred because they give to the polymer composition the best properties are:

vinyltrimethoxyethoxysilane, the formula of which is the following:

$H_2C{=}CHSi(OCH_2CH_2OCH_3)_3$ vinyltriethoxysilane, the formula of which is the following:

$H_2C{=}CHSi(OCH_2CH_3)_3$

The alkoxysilane ratios were between 0.5–5 phr.

Curing Agent

The ethylene and vinyl acetate based compositions can be vulcanized using traditional curing procedures, such as chemical, thermal and radiation procedures. The curing agents employed in the present invention were organic peroxides, dieumyl peroxide and a, a bis(terbutylperoxy) diisopropylbenzene, being the last ones used to develop the present invention. The curing agent ratios were 1–8 phr. The organic peroxides are activated during the vulcanization processes, producing the chemical bond between the ethylene and vinyl acetate polymer chains in a tridimensional matrix of carbon-carbon chains. To carry out the chemical crosslinking in the present invention the use of other curing agents that generate free radicals is possible. To select the curing agents it is necessary to take into account the decomposition temperatures of said agents, in order to avoid undesirable problems during the mixture and extrusion processes. The curing agent amounts and/or ratios to be used will be defined based on the type of application because depending on the increase of the curing agent content in the formula, the following properties will be improved and/or reduced.

Higher and/or lower thermostability after long term and short term aging in oven and under operating temperatures of 90° C., 125° C. and 135° C.

Higher and/or lower ignition resistance and fire resistance.

Higher and/or lower resistance to corrosive chemical fluid attack.

Higher and/or lower resistance to oils.

Higher and/or lower abrasion resistance.

Higher and/or lower dielectric stiffness resistance.

Higher and/or lower resistance to moisture, i.e. to gain and/or loss of electrical properties because of water absorption in the polymer compositions.

Process Additives

The process additives used in the present invention were selected in such a way that the compositions could be easily mixed and/or prepared and/or extruded and/or formed. Thus, the object of the present invention process additives is to obtain good rheological properties that permit the mixing and/or extrusion of the polymer composition. The triple lubricating composition of the present invention is constituted of the following elements:

a fatty acid and/or a fatty acid derivative referred to the aliphatic carboxylic acid containing 8 to 22 carbon atoms, saturated and unsaturated, such as stearic acid, caproic acid, isostearic acid, lauric acid and calcium stearate, the last one of this list being especially preferred because it is capable of promoting good rheological properties.

a low molecular weight silicone oil, being an excellent promotor to prevent the adherence of the compositions on metal surfaces, mainly on copper. Its amount and/or ratio must be carefully selected because it could have undesirable adherence consequences.

A microcrystalline wax and/or paraffin can be used preferably to complement the triple lubricating composition.

The fatty acid to silicone oil ratio used for each system should be from approximately 1:1 to approximately 1:6 and preferably about 1:3. And with regard to the paraffin to fatty acid ratio, it should be from approximately 1:1 to approximately 1:6 and preferably about 1:3. The total amount of the triple lubricant composition should be from approximately 0.25 phr to approximately 8 phr of the total polymer composition.

Antioxidant

To perform the invention, a great variety of antioxidants were used such as 1,2-dihydro-2,2,4 trimethyl quinoline, and/or combinations of phenols with steric hindrance such as distearyl 3,3'thio-dipropionate (DSTDP), bis(2,4 di terbutyl) pentaerythritol diphosphite, tris(2,4 di-terbutyl) pentaerythritol diphosphite, tris(2,4 di-terbutyl phenyl) phosphite, zinc 2-mercaptotoluimidazole salt, 2,2' thiodiethyl bis-(2,5-diterbutyl-4-hydroxyphenyl, 2,2'-thiobis-(6 terbutyl paracresol) and dilauryl 3,3' thio-dipropionate.

Combinations of di-alkyl-thio-dipropionate with the hindered phenols offered very effective thermal stability with the disadvantage that upon steam curing these combinations present copper discoloration and/or staining, the nature of said discoloration and/or staining is essentially due to the sulfur contained in the chain of this type of antioxidants. This copper staining can result in problems in the automatic systems for the application of harnesses and/or weldings. Other problems that occur with these systems is the discoloration and/or hue change of the compositions already pigmented with color concentrates, once said compositions are vulcanized, the possible cause of this problem being mainly due to the sulfur atoms contained in the main chain of this type of antioxidants.

In the present invention antioxidants were used that are capable of withstanding continuous operation temperatures of 125° C. and 135° C. during 3000 hours and/or aging in oven during 240 hours at 165° C. Basically, the invention contemplates the use of a package of antioxidants capable of fulfilling the previous requirements and also avoiding that the antioxidants used, discolor and/or stain the copper, or modify the hue of the pigmented compound upon vulcanizing with polymer composition vapor containing said antioxidants.

The antioxidants especially preferred in the present invention are:

Zinc 2 mercaptotoluilimidazole salt, of the following formula

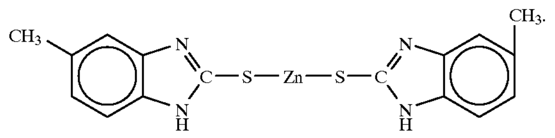

2,2' thiodiethyl bis-(3,5-diterbutyl 4 hydroxyphenyl) propionate, of the following formula

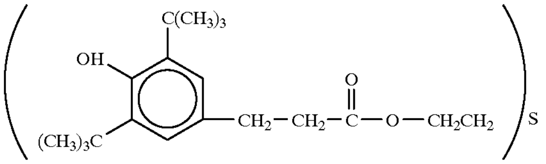

The amounts and/or ratios of the polymer compositions are preferably of approximately 1–8 phr.

Examples of Formulation Preparation

All the components previously described can vary within wide proportions. The important aspect of the polymer composition of the present invention is the interaction between vinyl alkoxysilane with the hydrated inorganic charge and the mixture of polymers used during the mixing and/or polymer composition preparation process. The inadequate dose of silane or amounts lower than 0.85 to 3.0 phr can be insufficient to offer the surface treatment to the hydrated inorganic charge and amounts above this range can cause undesirable effects with regard to the physico-mechanical properties after the material vulcanization.

The objective of the present invention is to have polymer compositions that meet the following requirements:

Fire resistance according to norm SAE-J-1128

Low smoke emission levels, acidity and toxic gases according to the French norm NFF-16-101 and to the norm IEC-754-1/2.

Thermostability sufficient to withstand oven aging temperatures of 125° C., 135° C., 158° C. and 165° C. during the following periods, 3000 hours at 125° C. and 135° C., 160 hours at 158° C. and 165° C. and 24 days at 165° C.

Electric properties for voltages within the following range: between 600 volts and 5000 volts, inclusive.

Resistance to oil according to IRM-902 under the following temperature levels and immersion periods: 50° C.-24 hours, 121° C.-168 hours, 70° C.-168 hours, 150° C.-100 hours.

Resistance to acids and bases (HCl and NaOH 1 N, respectively).

puncture resistance according to SAE J 1128 in TXL, SXL and GXL type automotive cables.

Fluid Resistance according to SAE J 1128.

The polymer compositions must not discolor and/or stain copper and must not provoke hue changes upon performing the curation of the same.

The compositions must present good rheological characteristics to mix and extrude these compositions at high line speeds.

EXAMPLE I

The present formulation was prepared according to what has previously been described. Ethylene and vinyl acetate (28% VA and melting index of 2.5 g/10 min.) based polyolefins were mixed with low density polyethylene with a melting index of 2 g/10 min. With the following comparative formulations, the improved fire resistance characteristics as well as low smoke emission, low acidity and low toxicity characteristics are demonstrated.

| Components | Formula 1 phr | Formula 2 phr |
|---|---|---|
| Copolymer EVA | 70 | 70 |
| Low density polyethylene | 30 | 30 |
| Trihydrated alumina | 125 | 135 |
| Vinyl trimethoxyethoxysilane | 1.5 | 1.5 |
| Calcium stearate | 2 | 2 |
| Silicone oil | 3 | 3 |
| Zinc 2 mercaptotoluilimidazole salt | 2 | 2 |
| Phenol with steric hindrance | 1 | 1 |
| 2,2'bis(terbutylperoxide)diisopropyl benzene | 2.5 | 2.5 |

The steric hindered phenol used was 2,2' thiodiethyl bis(3,5 diterbutyl 4 hydroxyphenyl) propionate.

The compound was prepared according to what has been described in the cable example summary.

The measured properties were, fire resistance according to norm SAE-J-1128; acidity according to norm IEC- 754-1/2, Smoke Index according to the French norm NFF-16-101.

The results obtained after the evaluation were:

| Characteristics | Unit | Formula 1 | Formula 2 |
|---|---|---|---|
| Flame propagation | s | 15 | 1 |
| Acidity | % | 0.45 | 0.1 |
| NBS chamber | | | |
| Dm | | 324 | 227 |
| VOF4 | | 102 | 16 |
| Toxicity Index | | 5.3 | 3.5 |
| Smoke Index | | 9.29 | 4.7 |

The results are good and show that the material can belong to the FO class according to the French norm NFF-16-101 for the automotive industry.

The FO classification is for materials that present extremely low smoke emission, acidity and toxicity levels.

What has been said shows that the polymer compositions with this type of components can substitute the halogenated compounds and these can be applied in the automotive industry.

The operation voltages for this type of composition were between 600 volts and 5000 volts according to ASTM D 150.

The results obtained after the evaluation were as follows: dielectric constant at 1000 Hz: 2.86 with dissipation factor at 1000 Hz: 0.00345.

The example I was repeated—formula 2, and the only modification was the amount of antioxidants and tetra (methylen (3,5-di-terbutyl-4-hydroxyhydrocinnamate)) methane was used as antioxidant in order to perform the comparative study to demonstrate that a 2,2' thiodiethyl bis(3,5 terbutyl 4 hydrophenyl) propionate is capable of withstanding short term (240 hours) and long term (3,000 hours) oven aging at different test temperatures (125° C. and 165° C.).

The measured properties were: tensile strength and elongation to failure, tensile strength retention and elongation to failure. Oxygen index, dielectric constant at 1000 Hz and dissipation factor at 1000 Hz.

The composition was prepared according to what has been described in the cable example summary.

The results are presented in the following table:

| Characteristics | Unit | Example I | Example II |
|---|---|---|---|
| Tensile strength | psi | 2756 | 2658 |
| Elongation to failure | % | 278 | 280 |
| OVEN AGING DURING 3000 HOURS AT 125° C. | | | |
| * Tensile strength | psi | 3013 | 3856 |
| * Elongation to failure | % | 76.5 | 2.3 |
| OVEN AGING DURING 240 DAYS AT 165° C. | | | |
| * Tensile strength retained | % | 103 | 58 |
| * Elongation to failure retained | % | 95 | 27 |
| Dielectric constant at 1000 Hz | | 3.78 | 3.91 |
| Dissipation factor at 1000 Hz | 0.0123 | 0.00897 | |
| Oxygen index | % | 27 | 27.5 |

The results obtained demonstrate that the use of the antioxidant 2,2 thiodiethyl bis(3,5 terbutyl 4 hydrophenyl) propionate results in good thermal stabilities. As a result it is observed that the polymer composition of example I does not discolor and/or stain copper once the material is vulcanized and it is also to be seen that the original hue of material once vulcanized does not change.

We claim:

1. A fire resistant, low smoke emission, and halogen-free polyolefinic formulation for insulation and protection of cables and electric conductors, comprising:

a) a synergistic mixture comprising ethylene/$C_2$–$C_6$ vinyl acid ester and low density polyethylene, optionally with additional polyethylene, polypropylene or copolymers/terpolymers thereof;

b) from about 80 to 400 phr of a hydrated inorganic flame retardant compound;

c) from about 0.5 to 5 phr of an alkoxysilane;

d) from about 1 to about 8 phr of a curing agent;

e) from about 0.35 to about 8 phr of an additive which is a three component lubricating mixture consisting essentially of i) a fatty acid and /or a fatty acid salt of 8 to 22 saturated carbon atoms; ii) a low molecular weight silicone oil; and iii) a microcrystalline wax and/or paraffin; wherein the ratio of fatty acid of fatty acid salt to silicone oil is about 1:1 to 1:6 and the ratio of the paraffin to fatty or fatty acid salt acid is about 1:1 to 16; and f) from about 1 to about 8 phr of an antioxidant agent.

2. The fire resistant, low smoke emission, and halogen-free polyolefinic formulation, according to claim 1, wherein the vinyl is selected from the group consisting of vinyl acetate, vinyl propionate, vinyl butyrate, vinyl pentanoate and vinyl hexanoate.

3. The fire resistant, low smoke emission, and halogen-free polyolefinic formulation according to claim 1, wherein the alkoxysilane is selected from the group consisting of vinyl trimethoxysilane, phenyl tris (2 methoxyethoxy) silane, methyl triethoxysilane,ethyl methyl tris- (2 methoxyethoxy) silane, dimethyl diethoxysilane, ethyl trimethoxy silane and vinyl trimethoxy silane.

4. The fire resistant, low smoke emission, and halogen-free polyolefinic of formulation according to claim 1, wherein the curing agent is selected from the group consisting of organic peroxide, dicumyl peroxide and α,α-bis (terbutyl peroxy) diisopropylbenzene.

5. The fire resistant, low smoke emission, and halogen-free polyolefinic formulation according to claim 1, wherein the antioxidant agent is selected from the group consisting of 1,2 dihydro-2,2,4-trimethyl quinoline, phenol with sterio hindrance and mixtures thereof.

6. The fire resistant, low smoke emission, and halogen-free polyolefinic formulation according to claim 5 wherein the antioxidant is selected from the group consisting of distearyl 3,3 thiodipropionate; bis (2,4 diterbutyl) pentaerythritol, diphosphite; tris (2,4di-terbutyl phenyl) phosphite; and 2,2'thiobis-(6 terbutyl para cresol); and dilauryl 3,3' thio-dipropionate and zinc 2-mercaptotidazole salt, 2,2' thiodiethyl bis-(3,5 diterbutyl-4 hydroxyphenyl) propionate, and mixtures thereof.

7. The fire resistant, low smoke emission, and halogen-free polyolefinic formulation according to claim 1, wherein the hydrated inorganic flame retardant compound is selected from the group consisting of hydrated alumina, hydrated magnesia, hydrated calcium silicate and hydrated magnesium carbonate.

8. The fire resistant, low smoke emission, and halogen-free polyolefinic formulation according to claim 2, wherein the copolymer is ethylene and vinyl acetate copolymer.

9. The fire resistant, low smoke emission, and halogen-free polyolefinic formulation according to claim 8 wherein the formulation ratio of vinyl acetate is about 9–48%.

10. The fire resistant, low smoke emission, and halogen-free polyolefinic formulation according to claim 10 wherein the formulation ratio of vinyl acetate is about 6–90%.

11. The fire resistant, low smoke emission, and halogen-free polyolefinic formulation according to claim 7, wherein the fatty acid salt is calcium stearate.

12. The fire resistant, low smoke emission, and halogen-free polyolefinic formulation according to claim 6, wherein the antioxidant agent is selected from the group consisting of zinc 2-mercaptotoluilimidazole salt, 2,2' thiodiethyl bis-(3,5 diterbutyl4 hydroxyphenyl) propionate and mixtures thereof.

13. A method of insulating and protecting cables and electric conductors comprising:

a) providing a fire resistant, low smoke emission, and halogen-free polyolefinic formulation, comprising:

i) a synergistic mixture comprising ethylene/$C_2$–$C_6$ vinyl acid ester and low density polyethylene, optionally with additional polyethylene, polypropylene or copolymers/terpolymers thereof;

ii) from about 80 to 400 phr of a hydrated inorganic flame retardant compound;

iii) from about 0. 5 to 5 phr of an alkoxysilane;

iv) from about 1 to about 8 phr of a curing agent;

v) from about 0.35 to about 8 phr of an additive comprising a triple lubricating composition essentially of; a) a fatty acid and /or a fatty acid salt of 8 to 22 saturated carbon atoms; b) a low molecular weight silicone oil; and c) a microcrystalline wax and/or paraffin;

wherein the ratio of fatty acid or fatty acid salt to silicone oil is about 1:1 to 1:6 and the ratio of the paraffin to fatty acid or fatty acid salt is about 1:1 to 1:6; and vi) from about 1 to about 8 phr of an antioxidant agent;

b) applying the formulation onto the cable to eliminate hydrogen halide smoke generation, to protect and insulate the cable and electric conductors.

14. The method according to claim 13, wherein the application of the formulation stabilizes the cable and electric conductor at a temperature of about 125° C. for about 3000 hours.

15. The method according to claim 13, wherein the application of the formulation stabilizes the cable and electric conductor at a temperature of about 165° C. for about 240 hours.

16. The method according to claim 13 wherein the antioxidant agent is selected from the group consisting of 1,2 dihydro-2,2,4-trimethyl quinoline and/or phenol mixtures with steric hindrance; said phenol mixtures selected from the group consisting of distearyl 3,3 thio-dipropionate; bis (2,4 diterbutyl) pentaerythritol diphosphite; tris (2,4-diterbutyl phenyl) phosphite; 2,2'thiobis-(6 diterbutyl para cresol); dilauryl 3,3' thio-dipropionate and zinc 2-mercaptotoluilimidazole salt, 2,2' thiodiethyl bis-(3,5 diterbutyl4 hydroxyphenyl) propionate, and mixtures thereof.

17. The method according to claim 16 wherein the antioxidant agent is selected from the group consisting of zinc 2-mercaptotoluilimidazole salt, 2,2' thiodiethyl bis-(3,5 diterbutyl-4 hydroxyphenyl) propionate, and mixtures thereof.

18. A fire resistant, low smoke emission, and halogen-free polyolefinic formulation for insulation and protection of cables and electric conductors, comprising:

a) a synergistic mixture comprising ethylene/$C_2$–$C_6$ vinyl acid ester and low density polyethylene, optionally with additional polyethylene, polypropylene or copolymers/terpolymers thereof;

b) from about 80 to 400 phr of a hydrated inorganic flame retardant compound;

c) from about 0.5 to 5 phr of an alkoxysilane;

d) from about 1 to about 8 phr of a curing agent;

e) from about 0.35 to about 8 phr of an additive comprising a triple lubricating composition consisting essentially of a mixture of a) calcium stearate; b) a low molecular weight silicone oil; and c) a microcrystalline wax and/or paraffin;

wherein the ratio of calcium stearate to silicone oil is about 1:1 to 1:6 and the ratio of the paraffin to calcium stearate is about 1:1 to 1:6; and f) from about 1 to about 8 phr of an antioxidant agent.

* * * * *